March 6, 1962 G. A. BURDICK 3,024,385

IMAGE DISPLAY DEVICE

Filed May 6, 1958 2 Sheets-Sheet 1

INVENTOR
GLEN A. BURDICK
BY Robert E. Strauss
ATTORNEY

March 6, 1962 G. A. BURDICK 3,024,385

IMAGE DISPLAY DEVICE

Filed May 6, 1958 2 Sheets-Sheet 2

INVENTOR
GLEN A. BURDICK
BY Robert E. Strauss
ATTORNEY

United States Patent Office 3,024,385
Patented Mar. 6, 1962

3,024,385

IMAGE DISPLAY DEVICE

Glen A. Burdick, Waterloo, N.Y., assignor, by mesne assignments, to Sylvania Electric Products Inc., Wilmington, Del., a corporation of Delaware Filed May 6, 1958, Ser. No. 733,290
4 Claims. (Cl. 315—12)

This invention relates to image display devices and more particularly to cathode ray tubes adapted to be used in color television receiving apparatus.

Color picture tubes of the cathode ray type generally employ a display screen comprising a large number of screen areas each consisting of discrete red, blue and green color fluorescing dots, bars or strips. In order to obtain proper reproduction or transmitted images, an aperture mask or grid is generally utilized in the tube and is positioned adjacent the screen to control the size and/or trajectory of the electron beam or beams. One of the chief disadvantages of these tubes is the amount of beam current required to obtain adequate screen brightness due to the loss occurring when a large number of the electrons strike the mask and also the amount of video drive and deflection power needed for operation of the tube.

Accordingly, an object of the invention is to achieve increased brightness in a cathode ray image display device without increasing the primary beam current.

A further object is to facilitate the use of lower scanning power, lower video drive, and lower anode voltage in cathode ray tubes without affecting acceptable brightness or resolution.

The foregoing objects are achieved in one aspect of the invention by the provision of an electron multiplier electrode positioned adjacent and spaced from the image display screen of a cathode ray tube. The electron beam or beams employed in the tube impinge upon secondary electron emissive material deposited on the multiplier electrode. The emitted secondary electrons, in addition to the primary electrons, strike the screen in the form of a beam. The density of this impinging beam is such that improved brightness is achieved for a lower value of primary beam current than has heretofore been needed.

For a better understanding of the invention, reference is made to the following description taken in conjunction with the accompanying drawings in which.

Figure 1:
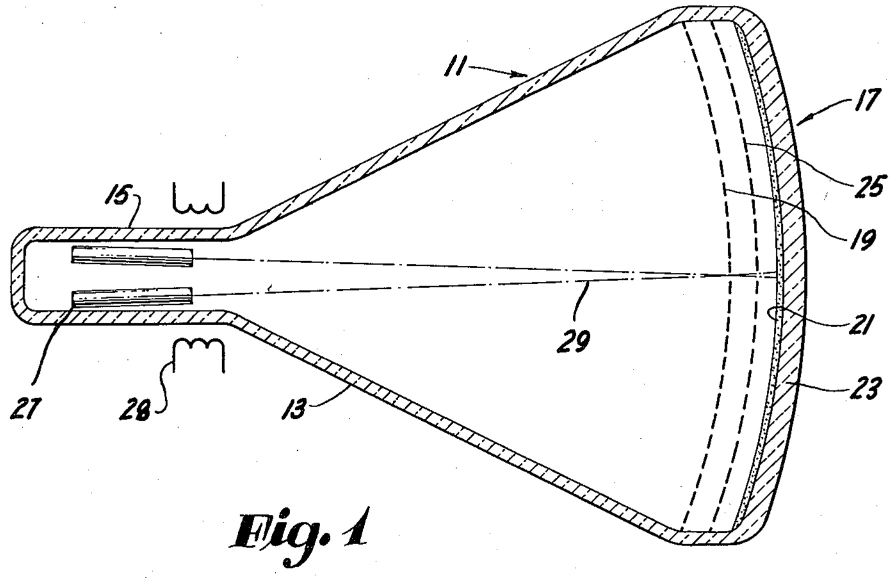
FIG. 1 is a plan view of a cathode ray type image display device.

Referring to the drawings, a shadow mask type color picture tube 11 is shown comprising an envelope 13 having a neck portion 15 and face panel assembly 17. An aperture mask 19 is spaced from the luminescent screen 21 formed on face plate 23. In accordance with one aspect of the invention, an electron multiplier electrode 25 is added to the tube elements intermediate mask 19 and screen 21. Multiplier electrode 25 has secondary electron emissive material deposited thereon to increase the beam current adjacent the screen.

Electrode means or guns 27 are disposed within neck portion 15 and constructed to provide the source, acceleration and focusing for electron beams 29. During operation of the tube, the beams are projected from electron guns 27 and proceed to converge at an aperture within mask 19 where they cross one another, strike multiplier electrode 25, and impinge upon screen 21 at spaced positions. Deflection coils 28 provide the deflection power for scanning electron beams 29 across screen 21 to produce an image in accordance with the transmitted signals. Two of the conventional three electron guns which are normally disposed 120° apart in a shadow mask color tube are shown for simplicity.

Figure 2:
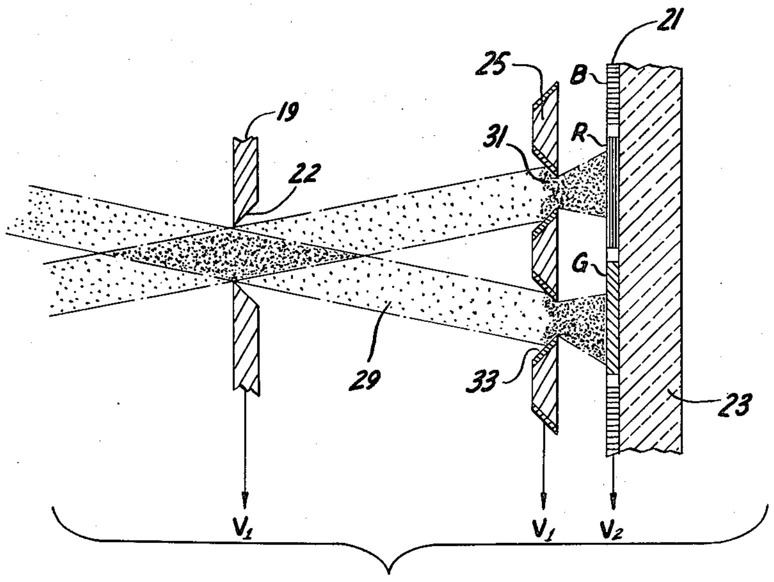
FIG. 2 is a sectional view of those elements of a cathode ray tube which affect the current density of the electron beam and the impinging position of the beam with the screen.
Figure 4:
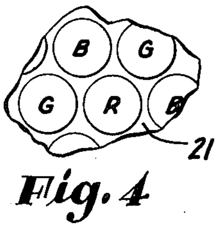
FIG. 4 is a small segment of a luminescent screen which may be employed in the tube shown in FIG. 1.

FIG. 2 illustrates in detail the function of electron multiplying electrode 25 in achieving a high density beam current prior to impingement upon screen 21. Aperture mask 19 is provided with a large number of apertures 22, each of which are aligned with each area or triad of red, green and blue color luminescing dots, R, B and G respectively, of the display screen shown in FIG. 4. The electron multiplying electrode 25 is spaced intermediate mask 19 and screen 21 and is provided with one aperture 31 for each discrete color luminescing dot.

As the beam is projected from electrode means 27 and deflected at a given angle, the beam proceeds through aperture 22 in mask 19 to strike the intercepting tapered surfaces defining apertures 31 in electrode 25 and then proceeds to strike the appropriate luminescent material dot, e.g. the red luminescing dot. The tapered surfaces of apertures 31 are coated with secondary electron emissive material 33 such as magnesium oxide. Accordingly, a large number of the primary electrons in each beam 29 impinges upon the secondary electron emissive material 33 to cause additional electrons to be emitted therefrom.

The voltage $V_2$ on screen 21 is at a higher positive potential than the voltage $V_1$ imposed upon electrodes 19 and 25. Therefore, both the primary electrons in beams 29 and the secondary electrons emitted from material 33 are caused to strike the luminescent dots and produce excitation thereof. Utilizing a structure and spacing of this type confines the beam sufficiently so that the cross sectional area is no larger than the impinged luminescent dot while at the same time providing exceptionally high density impinging beam current for relatively low primary beam current.

Figure 3:
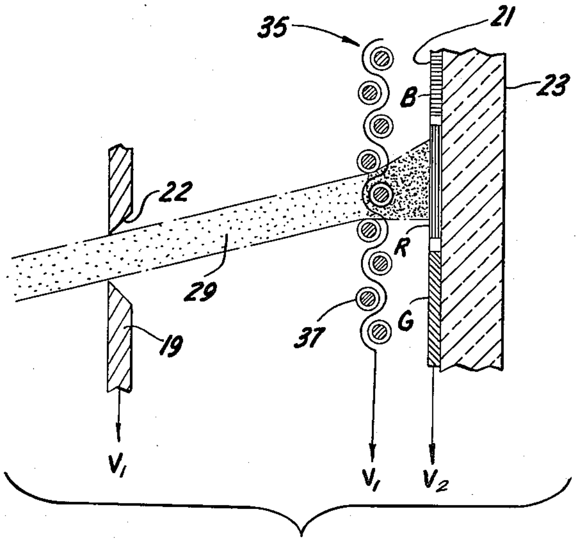
FIG. 3 is another embodiment of the invention illustrating the application of a wire mesh type electron multiplier electrode.

Referring to FIG. 3, the electron multiplying structure may comprise a fine wire mesh 35 coated with secondary electron emissive material 37. The mesh is mounted in spaced relationship between mask 19 and a screen 21 which may be of the type shown in FIG. 4. Primary electrons in beam 29 pass through aperture 22 in mask 19 and strike the intercepting wires of mesh 35 as they proceed to their impinging position with the luminescent dots of screen 21. The fineness of the wire mesh and the mesh to screen spacing determines the cross-sectional area of the impinging beam. These factors are regulated to assure a beam diameter no larger than the luminescent dot which the beam strikes. Since the voltage $V_2$ imposed on screen 21 is substantially higher than the voltage $V_1$ of mask 19 and wire mesh 35, the primary electrons in beam 29 and the secondary electrodes from the coating 37 on mesh 35 are attracted to the screen at high velocities. Excitation of the luminescent screen by impingement of the high current density beam is thereby achieved.

Figure 5:
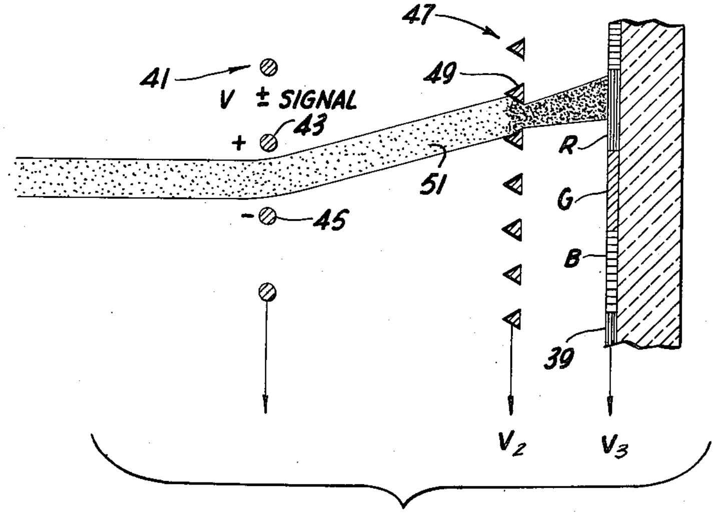
FIG. 5 illustrates another embodiment of a cathode ray tube structure utilizing an apertured electron multiplier electrode in conjunction with a strip type luminescent display screen.
Figure 6:
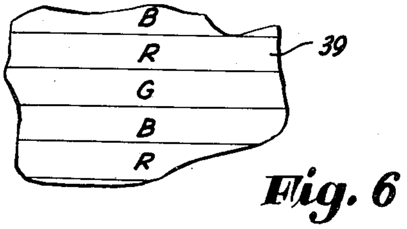
FIG. 6 shows in detail a segment of the luminescent screen illustrated in FIG. 5.

FIG. 5 illustrates another type of color display cathode ray tube utilizing a screen 39 having red, green and blue luminescing strips, R, G and B respectively, as shown in FIG. 6. A single beam originating from a single electron gun may be used with this tube. A wire deflection grid 41 is spaced from screen 39. The adjacent wires in this grid are chroma-modulated relative to one another to produce deflection of beam 29 to affect the impinging position of the beam on screen 39. For instance, when wire 43 is made positive relative to wire 45, beam 29 is deflected to strike the red luminescent strip. When the wires are at the same potential, the beam impinges on the green luminescent material and when wire 45 is made positive relative to wire 43, the blue luminescent material is excited.

A multiplier electrode 47 is shown comprising substantially triangular-shaped wires or segments which are disposed intermediate screen 39 and grid 41. The tapered surfaces of the electrode segments are coated with secondary electron emissive material 49. As beam 51 passes grid 41, it is deflected toward a luminescent strip e.g. the red strip. A large number of primary electrons in beam 51 strike emissive material 49, thereby causing secondary electrons to be emitted therefrom. The primary and secondary electrons are then accelerated to screen 39 by virtue of the fact that voltage $V_3$ on the screen is at a higher positive potential than the voltage $V_2$ on electrode 47. The voltage $V_1$ on grid 41 is lower than $V_2$ or $V_3$. Due to the additional secondary electrons, the current density of the screen impinging beam is sufficiently high to produce a display with a satisfactory level of brightness.

Although one multiplier electrode is shown and described, it is to be understood that a plurality of these electrodes may be utilized in the image display tubes by serially arraying them toward the screen. In this instance, each successive electrode has a slightly higher positive potential applied thereto so that the electrons will be accelerated toward the screen.

Although several embodiments of the invention have been shown and described, it will be apparent to those skilled in the art that various changes and modification may be made therein without departing from the scope of the invention as defined by the appended claims.

What is claimed is:

1. A multiple color image display device comprising a display screen formed to provide a plurality of screen areas each having discrete red, green and blue color fluorescing elements, electrode means spaced from said screen formed to project at least one electron beam to an impinging position with the screen, an apertured grid structure maintained at a given potential disposed intermediate the electrode means and said screen for determining the impinging position of said beam, each aperture in said grid structure being linearly aligned relative to a given screen area and said electrode means, and a single apertured electron multiplying electrode maintained at substantially said given potential having secondary electron emissive material deposited thereon at substantially the same distances from the screen and positioned between the grid and said screen in the path of said electron beam.

2. A multiple color image display device comprising a display screen formed to provide a plurality of triads each having discrete red, green and blue color fluorescing dots, electrode means spaced from said screen formed to project at least one electron beam to an impinging position with the screen, an apertured mask maintained at a given potential disposed intermediate the electron means and said screen for determining the impinging position of said beam, each aperture in said mask being aligned relative to a given triad, and an electron multiplying electrode positioned between said mask and the screen maintained at said given potential, said electron multiplying electrode having apertures formed therein defined by tapered walls coated with secondary electron emissive material, each aperture in said electron multiplying electrode being aligned relative to a fluorescing dot with said walls disposed to substantially intercept said electron beam.

3. A multiple color image display device comprising a display screen formed to provide a plurality of triads each having discrete red, green and blue color fluorescing dots, electrode means spaced from said screen formed to project at least one electron beam to an impinging position with the screen, an apertured mask maintained at a given potential disposed intermediate the electrode means and said screen for determining the impinging position of said beam, each aperture in said mask being linearly aligned relative to a given triad, and a single wire mesh electrode maintained at substantially said given potential positioned between said mask and the screen to intercept said beam, said mesh having a coating of secondary electron emissive material deposited thereon with all of the material at substantially the same distance from the screen.

4. A multiple color image display device comprising a display screen formed to provide a plurality of screen areas each having discrete red, green and blue color fluorescing strips, electrode means spaced from said screen formed to project at least one electron beam to an impinging position with the screen, a wire grid structure having a color modulating voltage imposed thereon disposed intermediate the electrode means and said screen for determining the impinging position of said beam, and an electron multiplying electrode positioned between said grid and the screen, said electron multiplying electrode having apertures formed therein defined by tapered walls coated with secondary electron emissive material, each of said electron multiplying electrode apertures being aligned relative to a fluorescing strip with said walls disposed to substantially intercept said electron beam.

References Cited in the file of this patent

UNITED STATES PATENTS

| | | |
|---|---|---|
| 2,503,949 | Jensen | Apr. 11, 1950 |
| 2,607,903 | Labin | Aug. 19, 1952 |
| 2,646,521 | Rajchman | July 21, 1953 |
| 2,685,660 | Norgaard | Aug. 3, 1954 |
| 2,734,146 | Noskowicz | Feb. 7, 1956 |
| 2,821,637 | Roberts | Jan. 28, 1958 |

FOREIGN PATENTS

| | | |
|---|---|---|
| 712,254 | Great Britain | July 21, 1954 |